(12) United States Patent
Klepp

(10) Patent No.: US 7,913,411 B2
(45) Date of Patent: Mar. 29, 2011

(54) DIGITAL BORE GAGE HANDLE

(75) Inventor: Peter Klepp, Hopewell Junction, NY (US)

(73) Assignee: Dorsey Metrology International, Poughkeepsie, NY (US)

( * ) Notice: Subject to any disclaimer, the term of this patent is extended or adjusted under 35 U.S.C. 154(b) by 17 days.

(21) Appl. No.: 12/383,297

(22) Filed: Mar. 23, 2009

(65) Prior Publication Data
US 2009/0235546 A1   Sep. 24, 2009

Related U.S. Application Data

(60) Provisional application No. 61/070,276, filed on Mar. 21, 2008.

(51) Int. Cl.
  *G01B 5/12* (2006.01)
(52) U.S. Cl. .......................................... 33/544.5; 33/542
(58) Field of Classification Search ............... 33/544.5, 33/784, 792, 793, 794, 542, 544
  See application file for complete search history.

(56) References Cited

U.S. PATENT DOCUMENTS

| | | | | | |
|---|---|---|---|---|---|
| 2,930,134 | A | * | 3/1960 | Bishop et al. | 33/544.5 |
| 4,008,523 | A | * | 2/1977 | von Voros | 33/784 |
| 4,265,026 | A | * | 5/1981 | Meyer | 33/542 |
| 4,399,613 | A | * | 8/1983 | Nishikata et al. | 29/434 |
| 4,419,830 | A | | 12/1983 | Miller | |
| 4,509,267 | A | * | 4/1985 | Flaten | 33/644 |
| 4,612,656 | A | * | 9/1986 | Suzuki et al. | 377/24 |
| 4,736,313 | A | * | 4/1988 | Nishimura et al. | 702/162 |
| 4,977,681 | A | * | 12/1990 | Jiles | 33/544.5 |
| 5,337,488 | A | * | 8/1994 | Lemelson | 33/784 |
| 5,361,505 | A | | 11/1994 | Faughn | |
| 6,412,187 | B1 | * | 7/2002 | Sasaki et al. | 33/784 |
| 6,490,805 | B1 | | 12/2002 | Forschler et al. | |
| 6,510,620 | B2 | | 1/2003 | Bender | |
| 7,685,735 | B2 | * | 3/2010 | Kim | 33/784 |
| 2006/0162178 | A1 | | 7/2006 | Freidin | |
| 2007/0039197 | A1 | * | 2/2007 | Holec et al. | 33/784 |

OTHER PUBLICATIONS

Micro-Top, Micro Top Consulting, Engineering & Service srl, found: http://www.micro-top.eu/engleza/produse.php?id=136, webpage shows a bore gage from Micro Top that has a digital and a dial indicator.

* cited by examiner

*Primary Examiner* — Christopher W Fulton
(74) *Attorney, Agent, or Firm* — Saile Ackerman LLC; Stephen B. Ackerman

(57) ABSTRACT

Disclosed is a method and apparatus for measuring inside diameters of holes using a dial bore gage with a packaged digital transducer providing an amplified readable output to both dial indicator and digital display enabling wireless data transmission for recording its measured output.

11 Claims, 5 Drawing Sheets

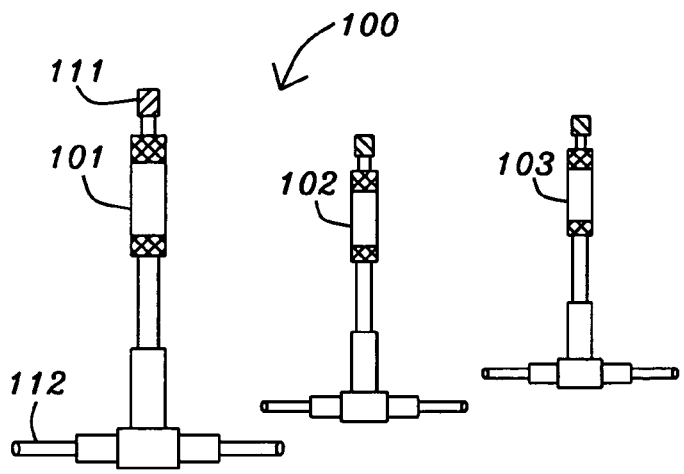
FIG. 1a – Prior Art
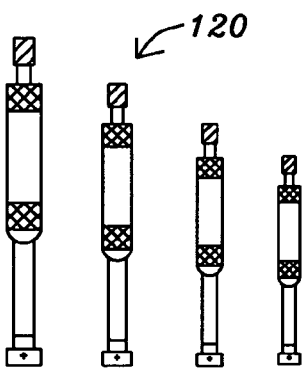
FIG. 1b – Prior Art
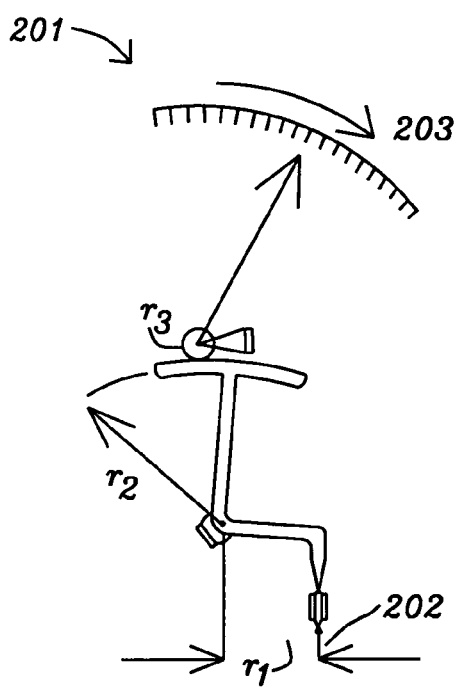
FIG. 2 – Prior Art

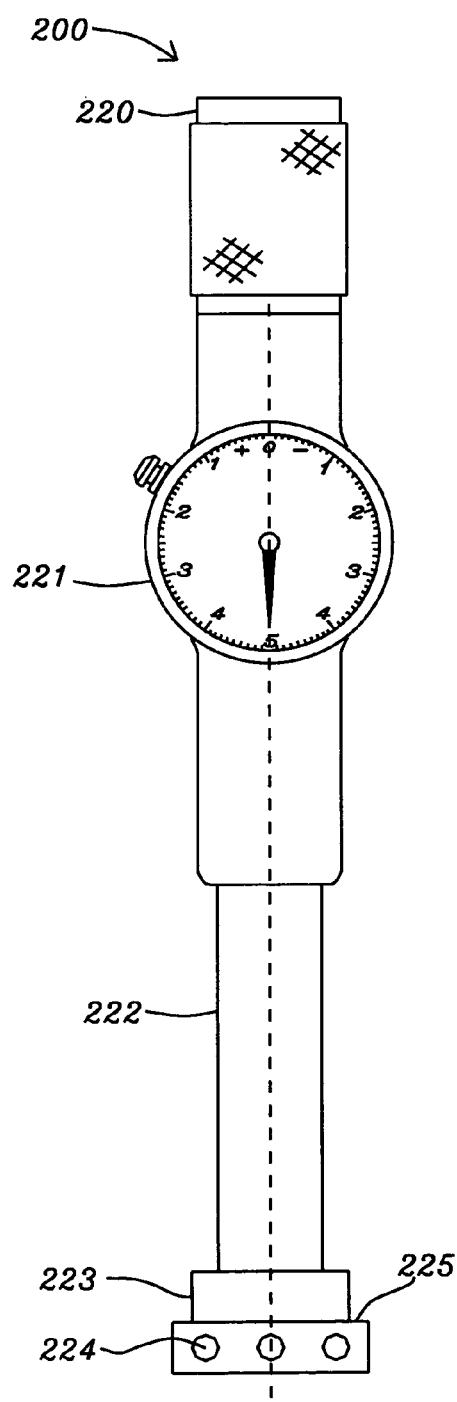
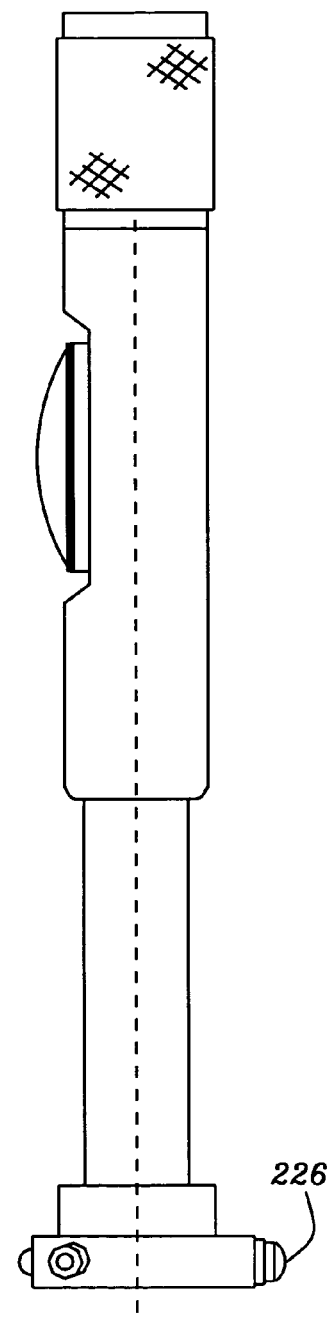
FIG. 3 – Prior Art
FIG. 4a – Prior Art

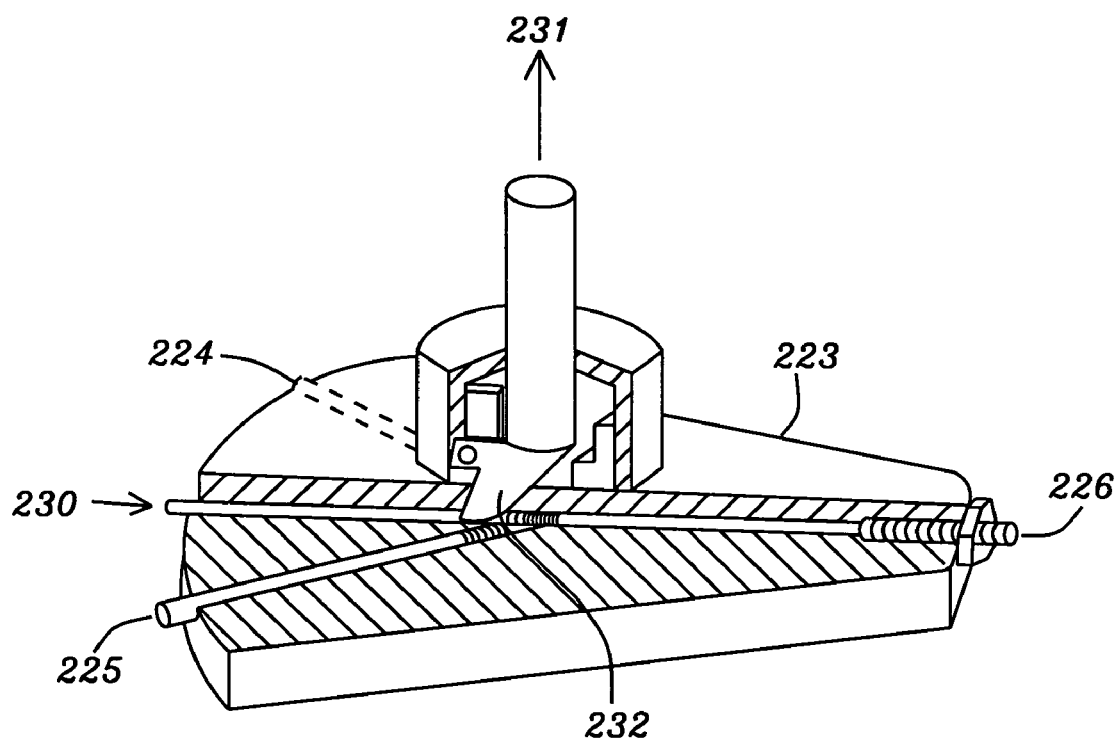
FIG. 4b - Prior Art

DIGITAL BORE GAGE HANDLE

This application claims benefit of Provisional application Ser. No. 61/070,276, filed on Mar. 21, 2008, and herein incorporated by reference in its entirety.

BACKGROUND OF THE INVENTION (1) Technical Field

The present invention relates generally to improvements for dial gage instruments used for small displacement measurements, and more particularly, to provide a visual analog readout with means to digitally display and or record the measured values.

(2) Description of the Prior Art

A bore gage is a relevant expression for a measuring tool that is used for measuring the inside diameters of holes. Several types of bore gages are shown in FIGS. 1a, 1b, and FIG. 3. In FIG. 1a a telescopic gage set 100, each with a limited measuring range, are illustrated having different physical dimension as shown in telescopic gages 101, 102, 103 are all used to measure different bore sizes. The telescopic gage can be compared to inside calipers requiring the technician to develop the correct feel to obtain repeatable results. The measured diameter is locked-in by twisting the knurled end of the handle 111 and then transferring the locked-in measured diameter to a remote measuring tool.

FIG. 1b illustrates a set 120 of small hole gages that also require that the adjustments be measured by a remote measuring tool. The small hole gages are initially set smaller than the bore to be measured and then adjusted by rotating a knurled knob until light pressure is felt, indicating to the technician the inside diameter has been reached before removing the gage out of the bore for subsequent measuring by external means.

Of the many methods for mechanically measuring small displacements, the mechanical dial gage is the most popular. This device is used in many applications, for example, dial depth, dial bench, dial O.D, dial snap, dial bore etc., and is familiar to most experimenters and machinists. The units consist of mechanical levers and gears, which suitably amplify the motion, see FIG. 2, showing, schematically, the working parts of a simple dial gage 201. It is apparent that the magnification of the unit shown is equal to $(r_2/r_1) \times (r_4/r_3)$. By suitable gearing, magnification of the order of 1000 can be achieved, i.e., an input movement 202 of $10^{-4}$ inch produces a readable output movement 203 of $10^{-1}$ inch.

Referring to FIGS. 3, 4a and 4b, showing a dial bore gage 200 is a dial indicator type that measures a range of holes directly. The tool consists of a range of interchangeable gauging heads 223, in which a precision centralizer having spring loaded contacts 224, and 225 making up a tandem centralizer with an adjustable spring backed contact 226, all three contacts ensuring centering of the gauging head for accurate and repeatable centering while contact 230 transfers horizontal motion to vertical motion by a bell crank motion transfer mechanism that is accurate and linear over its entire range. The vertical motion is transferred to a freely moving rod at its proximal end. A tubular shield 222 contains the rod 231 that transfers axial movement from the gauging head to a dial indicator. The dial indicator 221 mounted and in contact with the distal end of rod 231 measures axial movement of the rod. This combination permits the bore size to be accurately read from the instrument while writing the measured variance to record.

SUMMARY OF THE INVENTION

It has been an object of the present invention to provide an improved dial gage with a digital transducer for displaying and or recording measurements of small displacements in metric or inch units. The improvement is achieved by packaging a digital transducer with a circuit latch to enable or inhibit operation with a standard analog gage. This combination achieves the following.

A bore gage using a dial indicator provides a visual analog reading that differentiates true diameter measurements by eliminating erroneous readings produced by particulate interference within the bore surface.

Digital readings are remotely recorded for quality control purposes as the tool is enabled for wireless data transmission as a preferred embodiment. The tool can be used with a USB transmission cable as a second embodiment, or used as a stand-alone without data transmission as a third embodiment.

It is another object of the present invention to eliminate human error caused by erroneous transcription of a measured reading It is still another object of the present invention to provide measurement efficiency and to reduce operator fatigue.

It is yet another object of the invention to improve quality control performance and to reduce costly mistakes.

Other objects and advantages of the invention will become apparent during the course of the following description of the accompanying drawings.

These objects are achieved by using a dial bore gage handle encasing a digital transducer that includes a knurled detachable handle having a threaded bottom end and a capped top end. The top end of the handle has a cavity to encase a digital transducer with a circuit latch to enable or to inhibit digital operation including a digital display window disposed along its outside periphery. The threaded bottom end engages a threaded hole in the near end of a housing of the bore gage. The threaded bottom end of the handle has a hole for a rod to be inserted. The rod in the handle is urged axially against a second rod that is contained within the bore gage housing making both rods reactive to small axial displacements from a gauging head that is disposed on the far end of the housing of the bore gage. The axial movement of both rods produces a readable output to both dial indicator and digital display. The digital readable output is enabled for wireless data transmission These objects are further achieved by a method for using a digital handle with a dial bore gage by providing a standard bore gage with dial indicator, a precision centralizer and an adjustable bore gage set master along with a digital handle and a display unit responsive to wireless data reception. The standard handle is removed and replaced with a digital handle encasing a digital transducer. The bore gage calibration steps include:

1. latching out the digital circuit;
2. Using the bore gage set master wherein the bore gage is inserted, off axis, in the bore of the set master while rocking to establish a true diameter reading;
3. adjusting indicator hand to zero;
4. latch in digital circuit;
5. preset bore diameter to be measured on digital display in either metric or inch units;
6. zeroing±tolerance readings.

DESCRIPTION OF THE DRAWINGS

FIGS. 1a and 1b are perspective viewpoints of conventional bore measuring devices of the prior art.

FIG. 2 shows schematically the working parts of a simple dial gage of the prior art.

FIGS. 3 and 4a illustrate a dial bore gage of the prior art.

FIG. 4b shows the mechanism of a gauging head

DETAILED DESCRIPTION OF THE PREFERRED EMBODIMENT

Figure 5:
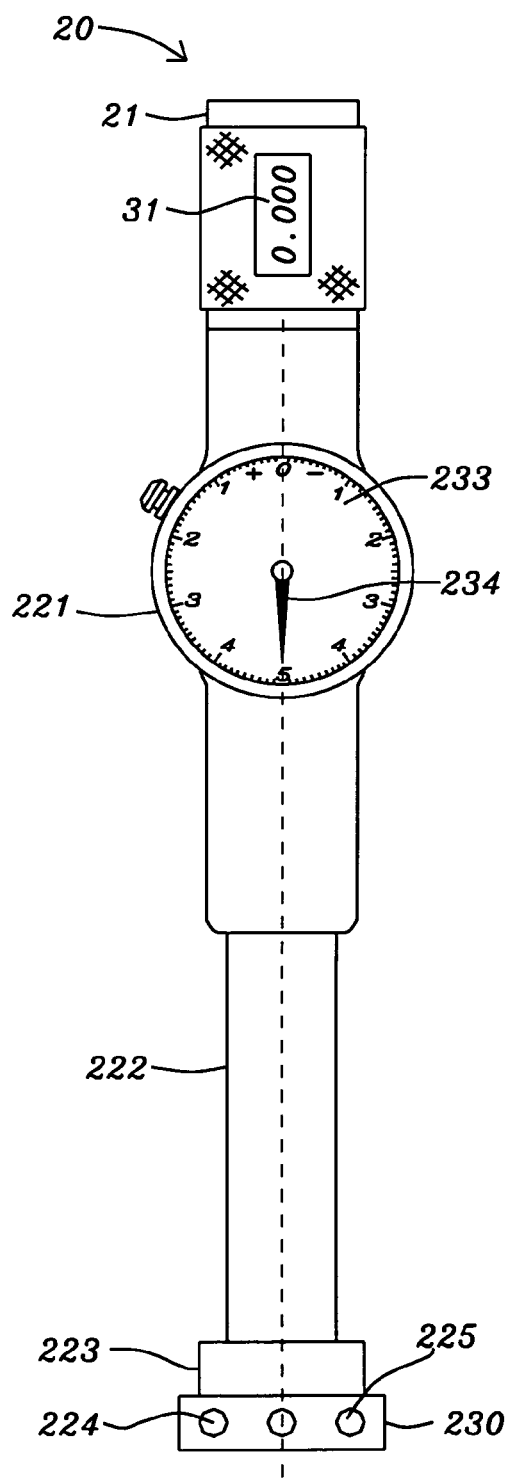
FIGS. 5 and 6 illustrate a dial bore gage of the invention.
Figure 6:
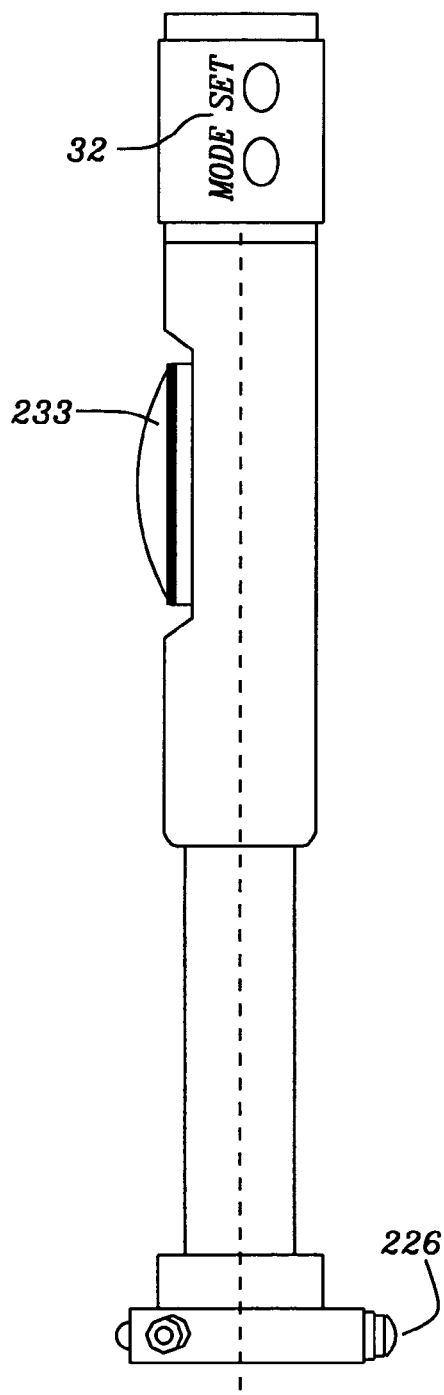
Figure 7:
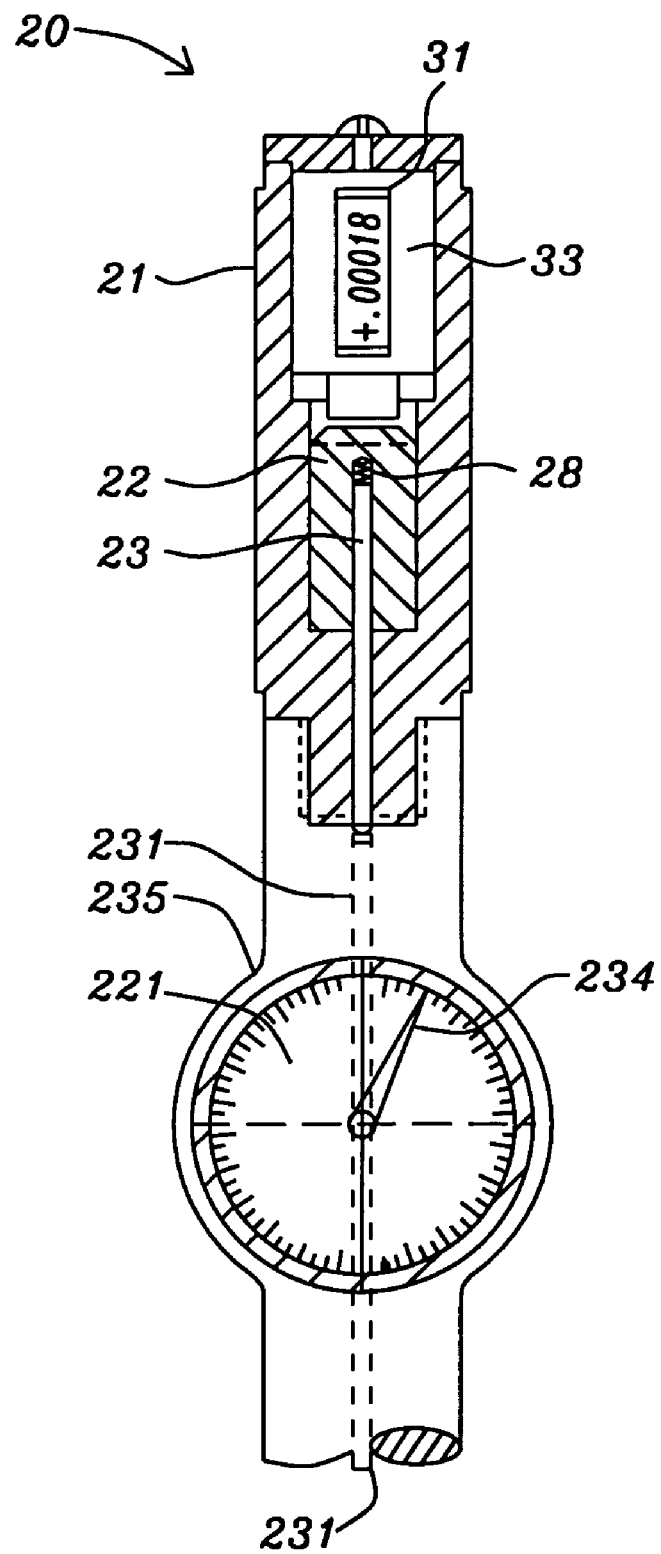
FIG. 7 illustrates a dial bore gage of the invention.

FIGS. 5 and 6 illustrate a bore gage 20, of the invention, having a detachable knurled handle 21 that includes a digital output display 31 and control buttons 32 interrelating with a built-in digital transducer 22 schematically shown in FIG. 7.

The digital output display 31 is powered by a battery (now shown) and registers a digital dimension of small displacement of a first shaft 23 whose proximal end coupled by contact to a distal end of a second shaft 231 wherein the second shaft displacement produces an amplified readable output on a dial face 221 of a dial indicator 233. A spring 28 positioned at the distal end of the first shaft urges contact against the second shaft. The second shaft 231 extends to a gauging head 223.

The integrated combination, of the invention, using both analog and digital provides the user with the following advantages.

1) The gauging head 223 is designed to automatically align and self-center the gauging contact pin 230 and reference contacts 224, 225 and 226 during operation. During use, the gage is inserted into the bore at an angle. The centralizer insures locating on the true diameter while the gage is "rocked" to obtain a true diameter reading. The true diameter is discerned while watching the movement of the needle 234 on the face of the dial indicator 233. Any discrepancies in the dial reading, i.e., high points produced by particulates causing the needle to indicate a lesser diameter at its location can be easily resolved by an experienced user observing the needle movement.

2) The digital reading may be remotely recorded for quality purposes as the tool is enabled for either wired or wireless data transmission. Wireless data transmission is by various methods known in the art, but is preferably done by RF transmission using, for example, by either the Bluetooth or Wi-Fi protocols. This is accomplished with an integrated circuit imbedded in the handle. Alternately, the tool may be connected by wire to a recording device, such as a computer, via, for example, a USB connection. The user records the measurement by pressing a record button. Wired or wireless transmission. This eliminates the need for the tool user to remember the measurement and write it out on a form.

Although the invention has been described with a certain degree of particularity, it is understood that the present disclosure has been made only by way of example and that numerous changes in the construction, data handling, and the manner of combining parts may be made without departing from the spirit and the scope of the invention.

What is claimed is:

1. A dial bore gauge handle encasing a digital transducer, comprising:
   a knurled detachable handle having a threaded bottom end and a capped top end;
   said threaded bottom end engaging a threaded hole in a housing of said bore gauge, and
   said threaded bottom end having a hole for a first rod to be inserted,
   said first rod axially contacting a second rod therein making said first and second rods axially reactive to small displacements from a gauging head having a precision centralizer;
   said top end of said handle having a cavity to encase a digital transducer including a digital display window disposed along its outside periphery;
   axial movement of said first and second rods produce an amplified readable output to both dial indicator and digital display;
   said digital readable output is enabled for wireless data transmission.

2. The handle of claim 1 further comprising the use of wireless data transmission to reduce transcription errors.

3. The handle of claim 1 wherein said rod is urged towards said gauging head.

4. The handle of claim 1 further comprising remotely recording readings for archival accuracy.

5. The handle of claim 4 wherein a true diameter is recorded by pressing a record button, as opposed to remembering the measurement value and writing it down, to improve record keeping.

6. A method for using a digital handle with a dial bore gauge, comprising the steps of:
   providing a standard bore gauge with dial indicator and a precision centralizer;
   providing a digital handle for said dial bore gage;
   providing a portable display unit responsive to wireless data reception;
   providing an adjustable bore gauge set master;
   removing standard handle from said dial bore gauge and replacing with a handle having a digital transducer;
   calibrating said bore gauge, and
   using said bore gauge by inserting said precision centralizer into a bore at an angle;
   said centralizer ensuring location on actual diameter of said bore as rocking said bore gauge achieves obtaining a true diameter measurement by watching the movement of a needle on face of said dial indicator.

7. The method according to claim 6 wherein calibrating said bore gauge comprising the steps of:
   1. latching out digital circuit;
   2. using said bore gauge set master wherein said bore gauge is inserted, off axis, in bore of set master while rocking to establish a true diameter reading;
   3. adjusting indicator hand to zero;
   4. latch in digital circuit;
   5. preset bore diameter to be measured;
   6. zeroing ± tolerance readings.

8. The method according to claim 7 wherein obtaining said truer diameter reading is discerned by a user observing movement of said dial indicator.

9. The method according to claim 6 wherein observing high and low points caused by particulates are easily resolved by an experienced user observing said dial indicator.

10. The method according to claim 6 wherein recording correct reading for quality purposes.

11. The method according to claim 6 wherein recording said correct diameter reading by pressing a record button as opposed to remembering the measured value and writing it.

* * * * *